US009661062B2

(12) United States Patent
Tsukamoto (10) Patent No.: US 9,661,062 B2
(45) Date of Patent: May 23, 2017

(54) INFORMATION-PROCESSING SYSTEM, INFORMATION-PROCESSING DEVICE, STORAGE MEDIUM, AND INFORMATION-PROCESSING METHOD (71) Applicant: NINTENDO CO., LTD., Kyoto (JP)

(72) Inventor: Shinji Tsukamoto, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 159 days.

(21) Appl. No.: 13/778,788

(22) Filed: Feb. 27, 2013

(65) Prior Publication Data
US 2014/0032662 A1 Jan. 30, 2014

(30) Foreign Application Priority Data

Jul. 27, 2012 (JP) ................. 2012-166881

(51) Int. Cl.
G06F 15/16 (2006.01)
G06F 15/177 (2006.01)
H04L 29/08 (2006.01)

(52) U.S. Cl.
CPC .............. *H04L 67/10* (2013.01); *H04L 67/28* (2013.01)

(58) Field of Classification Search
CPC ... G06Q 10/10; H04L 29/06; H04L 29/08072; H04L 29/06027; H04L 12/581; H04L 29/08981; H04L 41/0806; H04L 41/12
USPC ......................................................... 709/217
See application file for complete search history.

(56) References Cited

U.S. PATENT DOCUMENTS

| 9,098,333 B1* | 8/2015 | Obrecht | G06F 9/50 |
| 2005/0262223 A1* | 11/2005 | Kimura | H04L 29/06 709/220 |
| 2006/0120692 A1* | 6/2006 | Fukuta | G11B 27/105 386/230 |
| 2010/0241971 A1* | 9/2010 | Zuber | G06Q 10/10 715/753 |
| 2012/0086857 A1* | 4/2012 | Kim | G06F 9/4401 348/563 |
| 2012/0196675 A1* | 8/2012 | Ferdinand | G06Q 30/02 463/29 |
| 2012/0198021 A1* | 8/2012 | Ahn | G06T 19/006 709/217 |

(Continued)

FOREIGN PATENT DOCUMENTS

JP 9-325938 12/1997
JP 2002-224452 8/2002

(Continued)

OTHER PUBLICATIONS

[Online], "Xbox LIVE Connects You", <http://www.xbox.com/ja-JP/live/stayconnected>, and it's English counterpart <http://www.xbox-com/en-US/live/stay-connected>, 3 pages.

*Primary Examiner* — Mahran Abu Roumi
(74) *Attorney, Agent, or Firm* — Nixon & Vanderhye P.C.

(57) ABSTRACT

An exemplary information-processing device includes: an execution unit configured to execute a process relating to an application program selected from among a plurality of application programs; and a display control unit configured to control a display unit to display information indicated by at least one item of data obtained via a network from the storage unit that stores a plurality of items of data during loading of the application program or data used in the application program.

10 Claims, 8 Drawing Sheets (56) References Cited

U.S. PATENT DOCUMENTS

2013/0162654 A1\* 6/2013 Borovsky ............... G06T 13/00
                                                                                     345/474
2015/0119138 A1\* 4/2015 Koplar ................... A63F 13/12
                                                                                     463/29

FOREIGN PATENT DOCUMENTS

| JP | 2010-35968 | 2/2010 |
| JP | 2010-46159 | 3/2010 |

\* cited by examiner

| POST ID | TIME STAMP | APPLICATION ID | USERNAME | POST | BINARY DATA | TAG |
|---|---|---|---|---|---|---|
| 351245 | 2012/3/19 21:09 | AAA001 | TARO YAMADA | I GOT A SECRET SWORD IN THE VILLAGE. | 010010000... | 53 HRS, VILLAGE |
| 351244 | 2012/3/19 18:15 | ABB007 | HANAKO SATO | I SET A TIME RECORD OF 2:35:002 AT STAGE 5! | 010111110... | 12 HRS, STAGE 5 |
| 351243 | 2012/3/19 16:25 | AAA001 | HANAKO SATO | THE BOSS AT THE MOUNTAIN VALLEY IS TOO STRONG, I CAN'T BEAT IT. | (NONE) | 31 HRS, MOUNTAIN VALLEY |
| 351242 | 2012/3/19 14:55 | AAA001 | HANAKO SATO | I LEFT THE VILLAGE. | (NONE) | 29 HRS, VILLAGE |
| 351241 | 2012/3/19 11:31 | AAA001 | ICHIRO SUZUKI | I RECOMMEND THIS GAME. THIS IS FUN. | (NONE) | 35 HRS, CHURCH |
| ... | ... | ... | ... | ... | ... | ... |

INFORMATION-PROCESSING SYSTEM, INFORMATION-PROCESSING DEVICE, STORAGE MEDIUM, AND INFORMATION-PROCESSING METHOD

CROSS REFERENCE TO RELATED APPLICATIONS

This application is based on and claims priorities under 35 USC 119 from Japanese patent application No. 2012-166881, which was filed on Jul. 27, 2012.

FIELD

The present disclosure relates to techniques for accessing information providing services.

BACKGROUND AND SUMMARY

Information-processing devices whose users can communicate with other users using a communication function are known.

The present disclosure provides a technique for displaying information in accordance with execution of an application program.

There is provided an information-processing system including: an execution unit configured to execute a process relating to an application program selected from among a plurality of application programs; and a sharing unit configured to share data, wherein the sharing unit includes: a storage unit configured to store a plurality of items of data; and a providing unit configured to provide at least a part of the data stored in the storage unit to a user, and the execution unit includes a display control unit configured to control a display unit to display information indicated by at least one item of data obtained from the storage unit via a network during loading of the application program or data used in the application program.

BRIEF DESCRIPTION OF THE DRAWINGS

Exemplary embodiments will be described with reference to the following drawings, wherein.

DETAILED DESCRIPTION OF NON-LIMITING EXEMPLARY EMBODIMENTS

1. Configuration 1-1. Outline

Figure 1:
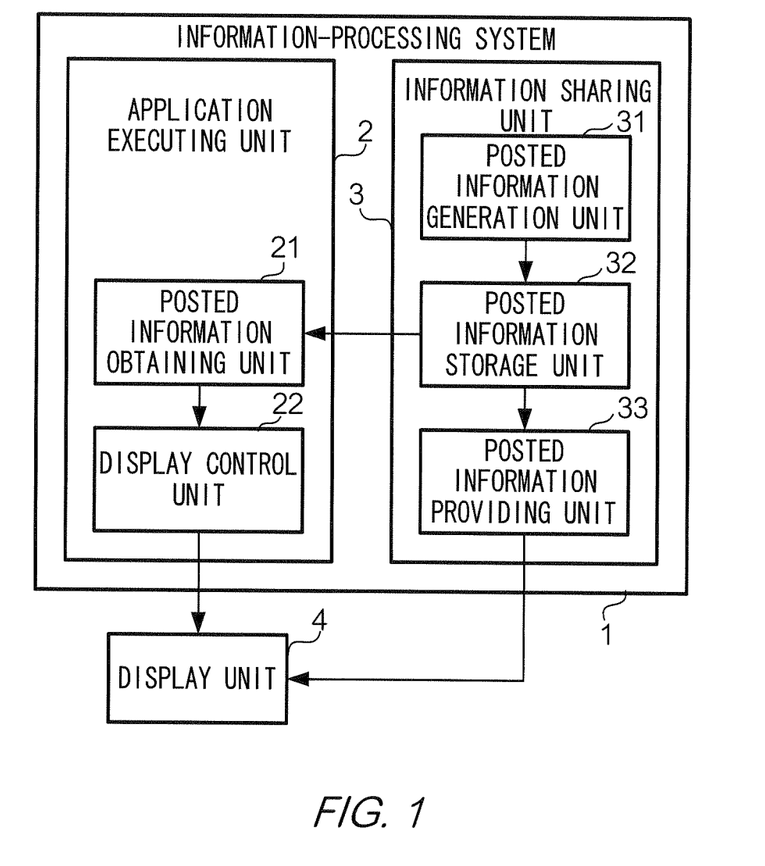
FIG. 1 shows an example of a functional structure of information-processing system 1 according to one embodiment.

FIG. 1 is a diagram showing a functional structure of information-processing system 1 according to one embodiment. Information-processing system 1 provides an information sharing service. This information sharing service includes a so-called electronic bulletin board function (hereinafter, the electronic bulletin board will be simply referred to as a bulletin board). A bulletin board function refers to a function by which a server accumulates posted information posted by a user from a terminal and provides the posted information to a user accessing the server so as to be able to view the posted information. The posted information is information including character strings (text), handwritten message (including handwritten characters and handwritten images), or images input by a user as a post (hereinafter, such information will be collectively referred to as "a message or the like" in some cases) as a post input by the user. Instead of, or in addition to, the bulletin board function, the posted information sharing service may have other functions such as a function for allowing posted information posted by a user to his or her site to be viewed by other users, a function for allowing other users to leave a message to the posted information, or a combination of these functions. A community is formed for at least part of these functions including the bulletin board. The community is, for example, a group constituted by plural users (a set of plural users). In this example, at least one community is formed for each of plural application programs that can be executed by application executing unit 2. For example, with regard to the bulletin board function, at least one community is formed for each of the application programs, and bulletin boards are provided separately for the respective communities.

Information-processing system 1 includes application executing unit 2, information sharing unit 3, and display unit 4. Application executing unit 2 executes a process relating to an application program (hereinafter referred to as "target application") selected from among the application programs. Information sharing unit 3 provides a data sharing function. Display unit 4 displays information including at least one of characters and images.

In this example, information sharing unit 3 provides a function for sharing posted information as data. Information sharing unit 3 includes posted information generation unit 31, posted information storage unit 32, and posted information providing unit 33. Posted information generation unit 31 generates posted information associated with at least one application program among the application programs. Posted information storage unit 32 stores the posted information generated by posted information generation unit 31 in association with identification information on the relevant application program. Posted information providing unit 33 provides the posted information stored in posted information storage unit 32 to the user. In this example, among the functions of information sharing unit 3, at least posted information storage unit 32 is provided by a server on a network.

Application executing unit 2 includes posted information obtaining unit 21 and display control unit 22. Posted information obtaining unit 21 obtains, via the network, posted information associated with an application program that is being executed by application executing unit 2 among the posted information stored in posted information storage unit 32. Here, the posted information obtained by posted information obtaining unit 21 is posted information posted by other users. Display control unit 22 controls display unit 4 to display at least an item of the posted information obtained by posted information obtaining unit 21, during loading of the target application or data used in the target application (hereinafter, loading of a program or data will be simply referred to as "loading" in some cases).

Figure 2:
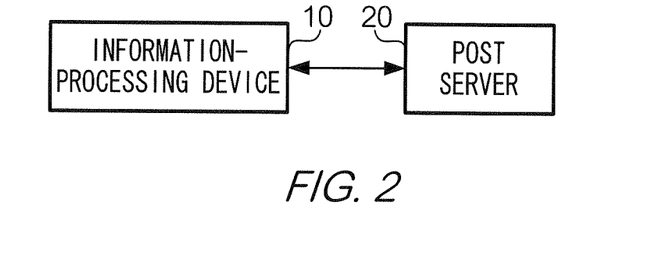
FIG. 2 shows an example of a device configuration of information-processing system 1.

FIG. 2 is a diagram showing a device configuration of information-processing system 1. Information-processing system 1 includes plural information-processing devices 10 and post server 20. Note that FIG. 2 shows only one information-processing device 10 for the sake of simplification. Post server 20 is a server device for providing the information sharing service. Although a single device functions as a server in this example, a device group including plural devices may alternatively function as a server. Information-processing device 10 is a client device (terminal device) for the information sharing service. In the information sharing service, posted information from each information-processing device 10 is transmitted to post server 20. Post server 20 includes a database that accumulates posted information. Post server 20 provides, according to a request from a specific information-processing device 10, the posted information accumulated in a database to information-processing device 10 that is the requestor. In other words, the user of information-processing device 10 can view messages of other users, release his or her own messages or the like, and exchange messages with other users through this information sharing service.

1-2. Information-Processing Device 10

Figure 3:
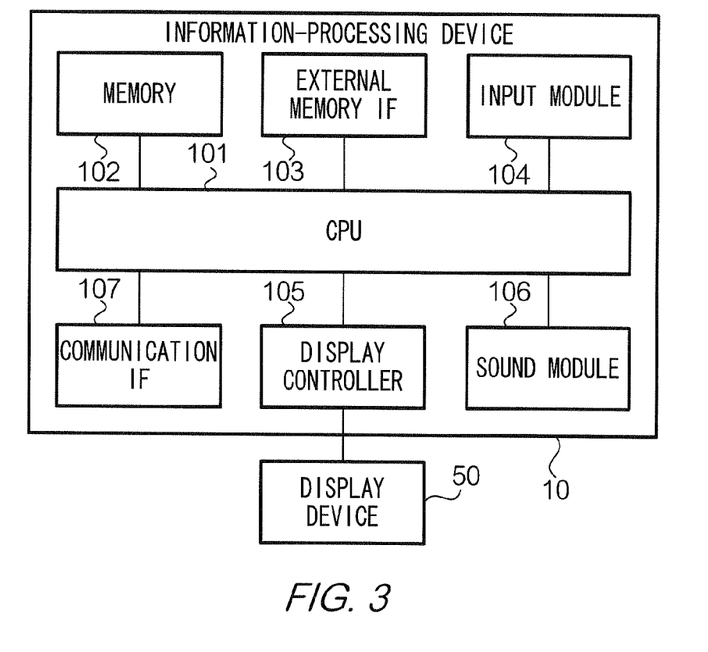
FIG. 3 shows an example of a hardware configuration of information-processing device 10.

FIG. 3 is a diagram showing a hardware configuration of information-processing device 10. In this example, information-processing device 10 is a game device for executing a video game. Information-processing device 10 is a computer device having CPU (Central Processing Unit) 101, memory 102, external memory IF 103, input module 104, display controller 105, sound module 106, and communication IF 107. Information-processing device 10 is connected to display device 50. Display device 50 is a device that displays information in the form of images, characters, and the like, and includes a display (a liquid-crystal panel, an organic EL (Electro-Luminescence) panel, or the like) and a drive circuit. In this example, information-processing device 10 is a so-called console-type game device and does not include display device 50. Display device 50 is an external device, such as a television receiver. Note that information-processing device 10 may include display device 50.

CPU 101 is a device that controls each component of information-processing device 10, and performs various calculations. Memory 102 is a storage device that stores programs and data, and includes a RAM (Random Access Memory) and a ROM (Read Only Memory), for example. External memory IF 103 is an interface that reads and writes programs and data from/to a storage medium (e.g., an optical disk, a magnetic disk, or a semiconductor memory) that is an external memory storing the programs and data. Input module 104 is an input device that inputs an instruction or a command from the user to CPU 101, and includes a keypad, buttons, a touch panel, or a microphone, for example. Display controller 105 is a device that controls the display device to display information which is in the form of at least one of images and characters, and includes an image processing circuit and a video signal output circuit, for example. Sound module 106 is a device that outputs an audio signal, and includes an audio processing circuit and an audio signal output circuit, for example. Communication IF 107 is a device that performs communication via a wired or wireless network (e.g., the Internet) according to a predetermined communication standard.

Figure 4:
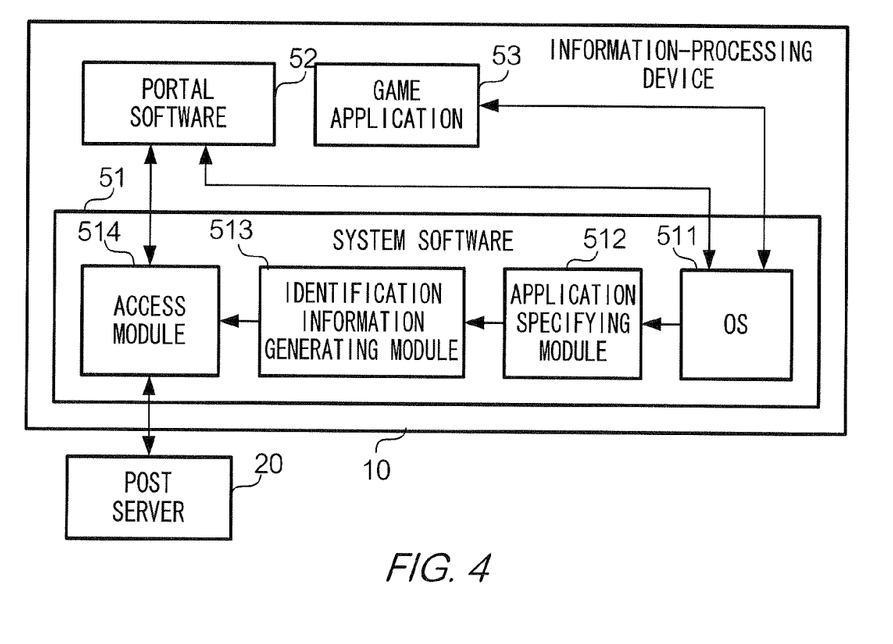
FIG. 4 shows an example of a software configuration of information-processing device 10.

FIG. 4 is a diagram showing a software configuration of information-processing device 10. Information-processing device 10 includes system software 51, portal software 52, and game application 53.

System software 51 is software for managing or controlling information-processing device 10. System software 51 is software that is essential for executing various application programs in information-processing device 10 and always exists in information-processing device 10 at the time of execution of application programs. In this example, system software 51 includes OS (Operating System) 511, application specifying module 512, identification information generating module 513, and access module 514. OS 511 is basic software for operating application programs including portal software 52 and game application 53. Application specifying module 512 specifies a user application program that is in an execution state. Specifically, application specifying module 512 obtains identification information (hereinafter referred to as "application ID") on the user application being executed. Identification information generating module 513 generates identification information, such as a URL (Uniform Resource Locator), for identifying a community corresponding to the user application program specified by application specifying module 512. Access module 514 communicates with a resource designated by the URL.

Note that the "execution state" includes "an execution continuation state" (a state where execution is continued without interruption)" and "an execution interruption state" (a state where execution is temporarily interrupted)". An application program in such states is referred to as "an application program being executed (or an application in the execution state)".

Portal software 52, which is client software for the information sharing service, displays information to the user, and provides an interface for accepting an entry of information by the user. Portal software 52 transmits a request to post server 20, and displays a community image in accordance with data transmitted from post server 20 according to the request. The community image includes one or more items of posted information from one or more users, and a UI (User Interface) for inputting and transmitting the posted information.

Note that if plural users share information-processing device 10, the one active user is specified based on a so-called login process.

Game application 53 is an application program (software) for causing information-processing device 10 to execute a video game. Information-processing device 10 is able to execute various kinds of game application 53. A program for implementing game application 53 is stored in, for example, a storage medium (external memory). The user causes information-processing device 10 to execute a desired game application 53 by causing information-processing device 10 to read the program stored in a desired storage medium among plural storage media that store different programs. In another example, plural programs are stored in memory 102, and the user causes information-processing device 10 to execute a desired game application 53 by starting a desired program among those programs.

In the present embodiment, system software 51 and portal software 52 are stored in advance in memory 102 at the time of sale of the information-processing device. In other words, system software 51 and portal software 52 are provided as functions on the platform of information-processing device 10. Game application 53 is stored in an external memory. Note that game application 53 may be stored in memory 102. Alternatively, at least one of system software 51, portal software 52, and game application 53 may be provided by download via the network, and updated to the latest version through network update.

1-3. Post Server 20

Figure 5:
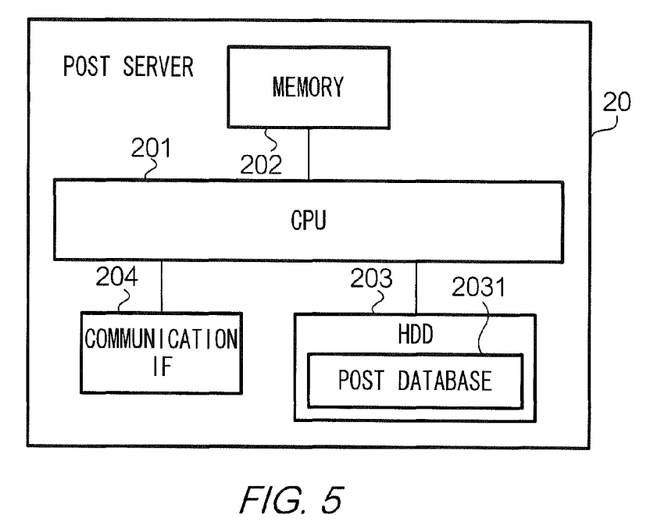
FIG. 5 shows an example of a hardware configuration of post server 20.

FIG. 5 is a diagram showing a hardware configuration of post server 20. Post server 20 is a computer device having CPU 201, memory 202, HDD 203, and communication IF 204. CPU 201 is a device that controls each component of post server 20, and performs various calculations. Memory 202 is a storage device that stores programs and data, and includes a RAM and a ROM, for example. HDD 203 is a nonvolatile storage device that stores the programs and data. Communication IF 204 is a device that performs communication via a wired or wireless network according to a predetermined communication standard. In this example, HDD 203 stores post database 2031. Post database 2031 is a database that stores plural items of posted information in association with identification information on application programs respectively associated therewith. HDD 203 stores a program (hereinafter referred to as "server program") for causing a computer to function as a server for the information sharing service.

1-4. Correspondence of Functions with Software and Hardware

CPU 101, when executing game application 53, is an example of application executing unit 2, posted information obtaining unit 21, and display control unit 22. The function implemented by CPU 101, when executing portal software 52 in cooperation with post server 20, is an example of information sharing unit 3. CPU 101, when executing portal software 52, is an example of posted information generation unit 31. HDD 203 in post server 20 is an example of posted information storage unit 32. Display device 50 is an example of display unit 4.

2. Operation

In information-processing system 1, game application 53 includes a function for causing posted information to be displayed during loading of a program or data. Hereinafter, a description will be given of an exemplary operation of game application 53 obtaining posted information, an exemplary operation of displaying posted information during loading of a program or data, an exemplary operation of invoking portal software 52 from game application 53 and accessing a community, and an exemplary operation of making a post from portal software 52.

2-1. Obtaining of Posted Information

Figure 6:
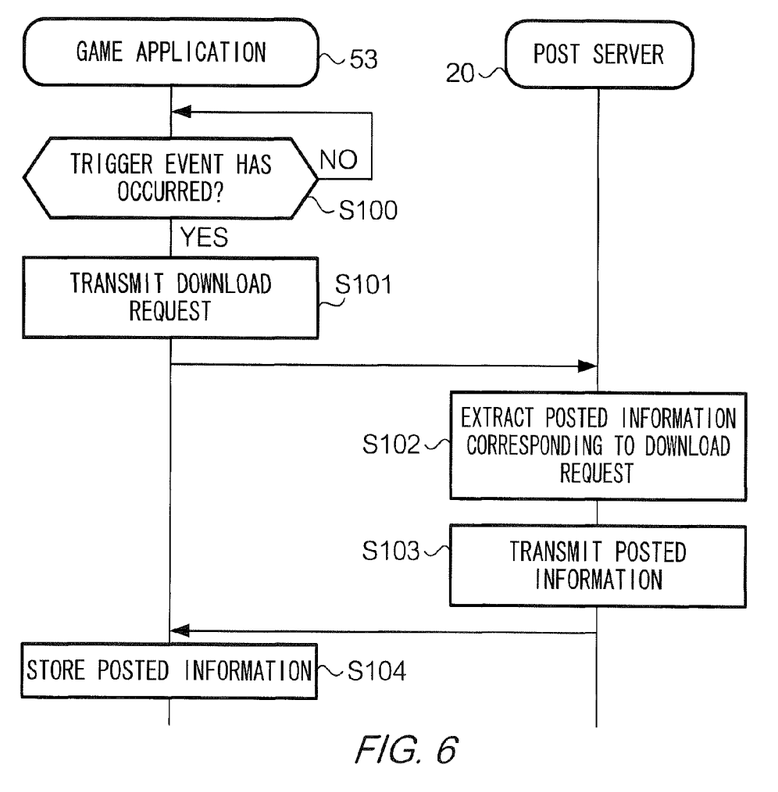
FIG. 6 shows an example of a sequence chart relating to processing for obtaining posted information.

FIG. 6 is a sequence chart relating to a process for obtaining posted information. Hereinafter, software such as game application 53 and portal software 52 will be described as the agent of the process, which means that a processor (e.g., CPU 101) executing the software performs the process in cooperation with other hardware. Game application 53 is started before the start of the process of FIG. 6. Game application 53 executes a process relating to the game, such as drawing of a virtual object (a character, an item, etc.) and a background, or a process for moving or deforming the virtual object.

In step S100, game application 53 determines whether or not an event (hereinafter referred to as "trigger event") that triggers download of posted information has occurred. The trigger event is determined in advance. The trigger event is, for example, an event such as an instruction to download posted information being given, a predetermined time period elapsing after the last downloading of posted information, a certain stage being cleared, the user beating a certain enemy character, the user winning in a match, the user losing in a match, or an instruction to load a program or data being given. Note that if game application 53 is not started before the start of the process of FIG. 6, the event of the game being started may be used as the trigger event. If it is determined that a trigger event has occurred (S100: YES), game application 53 advances the process to step S101. If it is determined that a trigger event has not occurred (S100: NO), game application 53 continues a process relating to the game.

In step S101, game application 53 transmits a request for downloading posted information (hereinafter referred to as "download request") to post server 20. The download request includes identification information (hereinafter referred to as "application ID") of game application 53. In this example, the download request further includes information indicating a condition (hereinafter referred to as "restriction condition") for narrowing down posted information to be downloaded. The restriction condition includes, for example, an upper limit of the number of items of posted information to be download (hereinafter referred to as "download upper limit number"), or information indicating progress of the game in game application 53 (hereinafter referred to as "progress information"), or the combination thereof. The progress information is, for example, a cumulative game play time, the number of times that the game has been cleared, the number of times that the game has been played, the number of times that a character appearing in the game has been beaten, the type of a character appearing in the game, the type of a predetermined event that occurs in the game, the number of wins or losses in the game, the number of items obtained in the game, the latest number among the cleared stages, the latest save point, an achieved score or record (which may be the highest score or the highest record), the level of a character, or actual performance (achievement: degree of achievement of various goals set for the respective games).

In another example, if the application program is a movie playback program, use information is used instead of the progress information. The use information is the number of times that a movie has been played till the end, a movie playback length, or the number of times that an instruction to play a movie has been given. In still another example, if the application program is a still image (electronic books, cooling recipes, etc.) display program, the use information is the number of pages displayed, the type of still images displayed, or the number of times when an instruction to display a still image is given.

Upon receiving the download request, post server 20 extracts the posted information corresponding to the received download request from among the posted information registered in post database 2031 (step S102).

Figure 7:
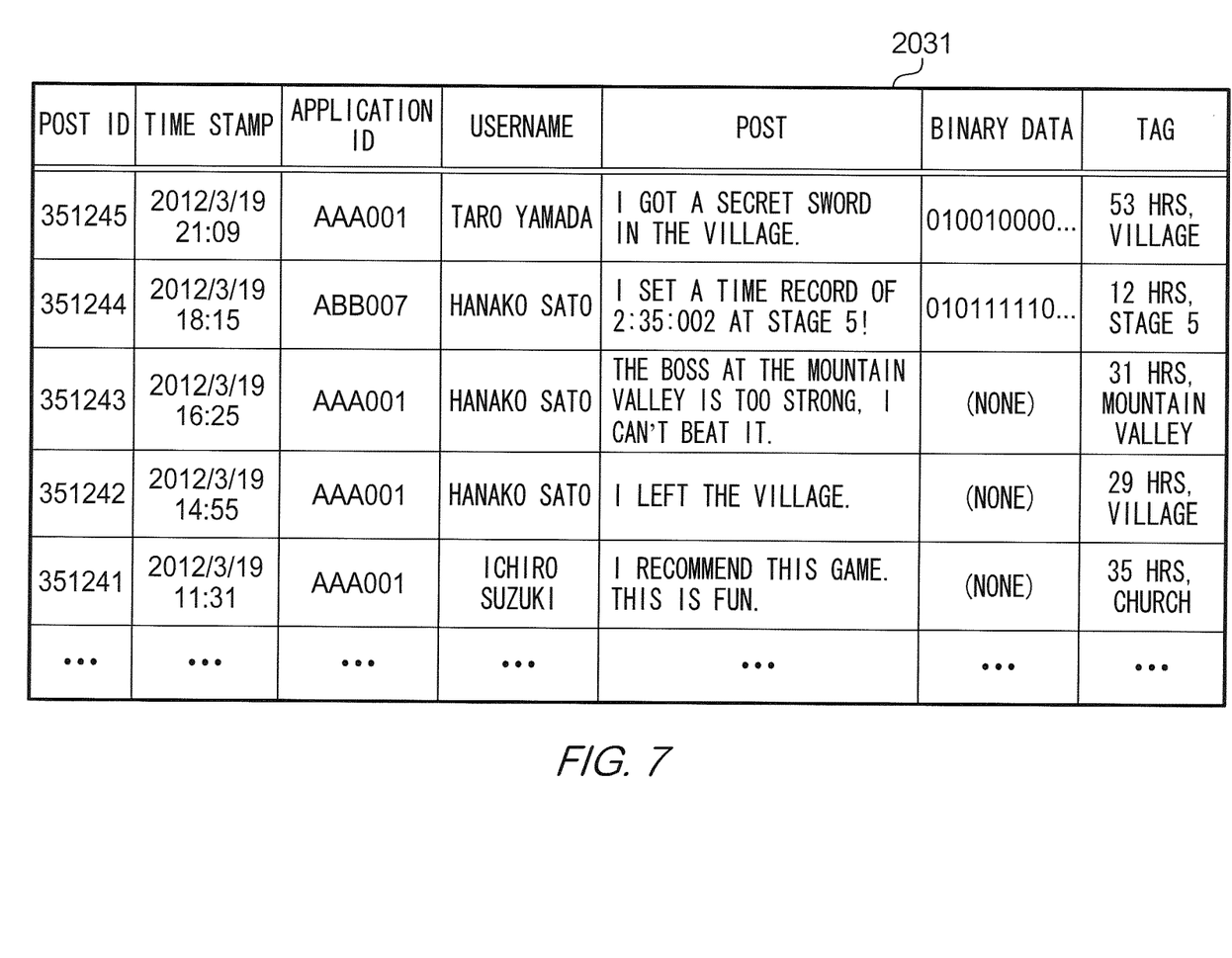
FIG. 7 shows an example of posted information registered in post database 2031.

FIG. 7 is a diagram showing exemplary posted information registered in post database 2031. Plural data sets are registered in post database 2031. Each data set includes a post ID, a time stamp, an application ID, a username, a post, binary data, and tags. The post ID is identification information for identifying posted information. The post ID is a number automatically assigned by post server 20 according to a predetermined rule (e.g., the order of receipt of posted information by post server 20). The time stamp indicates the time when the posted information was accepted (or the time when the post was made). The application ID is identification information for identifying the application program associated with the posted information, or more specifically, the application (the application being executed) that was being executed on the information-processing device when the instruction to post the posted information was given. The username is identification information for identifying the user that posted the posted information. The post is a character string input by the user. Note that instead of, or in addition to, the post, characters (image) handwritten by the user, or a character string automatically generated by the system may be used. The binary data is data used in the application program indicated by the corresponding application ID, or more specifically, the data generated by this application program. Each tag is data describing other related information. In this example, the tag includes the progress information. Note that FIG. 7 only shows an example, and the information included in the posted information is not limited thereto. Part of the information shown in FIG. 7 may be omitted, or information not shown in FIG. 7 may be added.

If both messages in the form of character strings and handwritten images are included in the posted information registered in post database 2031, post server 20 may extract only the posted information on the messages in the form of character strings. Alternatively, if game application 53 includes a function for displaying messages which are in the form of handwritten images, post server 20 may extract the posted information without distinguishing between character strings and handwritten images.

Further, post server 20 may extract only the posted information in the community to which the user that transmitted the download request belongs, from among the posted information registered in post database 2031. Alternatively, post server 20 may extract both the posted information in the community to which the user belongs and the posted information in other communities to which the user does not belong, without distinction. The community to which the user belongs is recorded and managed in a community database (not shown in the drawings) held by post server 20.

In this example, post server 20 extracts, from among the posted information registered in post database 2031, the posted information that includes the same application ID as that included in the download request and was narrowed down based on the restriction condition indicated by the information included in the download request. In this example, the restriction condition includes the download upper limit number and the progress information. Post server 20 extracts the download upper limit number of items of the posted information having the progress information corresponding to the progress information included in the restriction condition, from among the posted information registered in post database 2031. If, for example, the progress information indicates a cleared stage, "the posted information having progress information corresponding to the progress information included in the restriction information" is the posted information having progress information indicating that the same stage is cleared. In another example, if the progress information indicates the level of a virtual character, "the posted information having progress information corresponding to the progress information included in the restriction condition" is the posted information having progress information indicating that the level included in the restriction information is a level whose difference from the level of the virtual character is within a predetermined range.

The correspondence between the progress information in the restriction information and the progress information in the posted information is defined in advance by a server program. If there are more items of posted information that satisfy a condition associated with the progress information than the download upper limit number, post server 20 selects the download upper limit number of items of the posted information from among them. The rule for selecting the download upper limit number of items of the posted information from among more items of the posted information than the download upper limit number is defined in advance by the server program.

Referring again to FIG. 6, in step S103, post server 20 transmits the extracted posted information to information-processing device 10 that transmitted the download request.

In step S104, game application 53 stores the received posted information in the external memory.

2-2. Display of Posted Information During Loading

Figure 8:
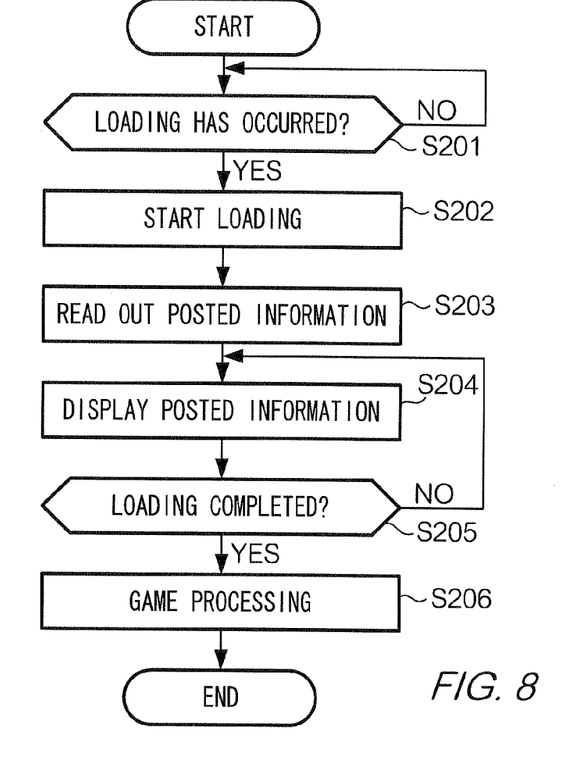
FIG. 8 shows an example of a sequence chart relating to processing for displaying posted information during loading.

FIG. 8 is a sequence chart relating to a process for displaying posted information during loading. Game application 53 is started before the start of the process of FIG. 8.

In step S201, game application 53 determines whether or not loading of a program or data has occurred. Loading of a program or data is a process for reading out a program or data from an external memory connected via external memory IF 103 and deploying the read data in memory 102. In other words, game application 53 determines whether or not a command to execute an instruction to read out a program or data from the external memory has been given. If loading of the program or data has occurred (S201: YES) game application 53 advances the process to step S202. If loading of a program or data has not occurred (S201: NO), game application 53 continues execution of a process relating to the game.

In step S202, game application 53 starts loading of the program or data. In step S203, game application 53 reads out the posted information from the external memory. The posted information read out here is the posted information downloaded from post server 20 and stored in the external memory. The number of items of the posted information to be read out is less than or equal to the download upper limit number, and is specified in advance. Game application 53 displays the read posted information on the image (step S204).

Figure 9:
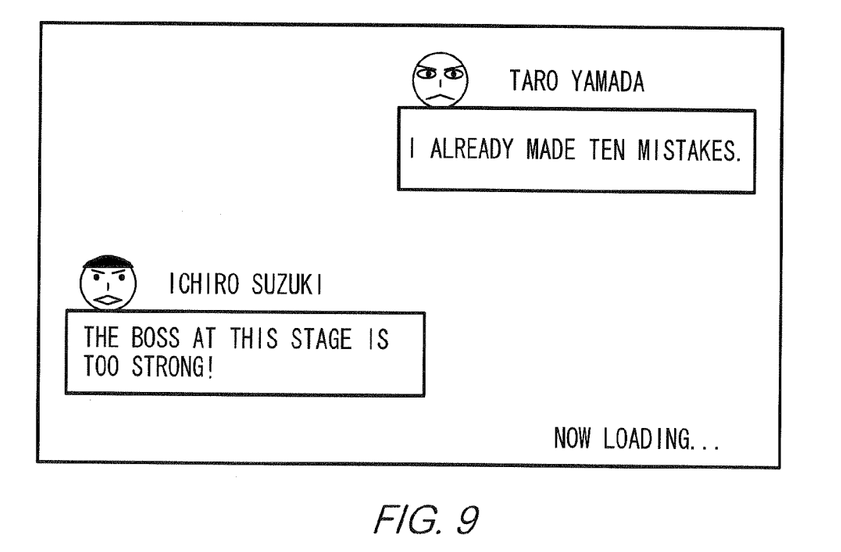
FIG. 9 shows an example of image on which posted information is displayed.

FIG. 9 is a diagram showing an exemplary image on which the posted information is displayed. In this example, two items of the posted information are displayed together with a "NOW LOADING" message indicating that the program or data is loading. In this example, the username, user image, and post in the posted information are displayed. Note that the user image is an image set for each user, such as an avatar image.

Referring again to FIG. 8, in step S205, game application 53 determines whether or not loading of the program or data has been completed. If it is determined that loading of the program or data has been completed (S205: YES), game application 53 advances the process to step S206. If it is determined that loading of the program or data has not been completed (S205: NO), game application 53 continues display of the posted information.

In step S206, game application 53 performs a process using the read program or data. In other words, game application 53 stops display of the posted information, and displays the game image.

According to this example, it is possible to provide posted information as a material for killing time during the "waiting time" while the program or data is loading. The posted information displayed here is posted information relating to the game the user is now playing (or the user is about to play) and corresponding to the user's progress in the game. In other words, the posted information displayed here relates to a matter in which the user is interested at this very moment. By using the posted information posted by other users whose progress is similar to that of the user, it is possible to display information that is likely to interest the user and arouse empathy.

2-3. Access to a Community

In this example, OS 511 temporarily interrupts execution of the game application and invokes a menu image when a specific operation is performed during execution of game application 53 (e.g., when a specific button among plural buttons of input module 104 is pressed). This menu image is provided as a function of system software 51. The menu image includes an item for giving an instruction to start portal software 52. If the user selects this item, OS 511 starts portal software 52. The user accesses the posting server via portal software 52. In this example, while the posting server is being accessed after the menu image is invoked, game application 53 that was being executed until then is temporarily interrupted (suspended). If a specific operation is performed in a state where game application 53 is suspended, OS 511 executes game application 53 again.

Figure 10:
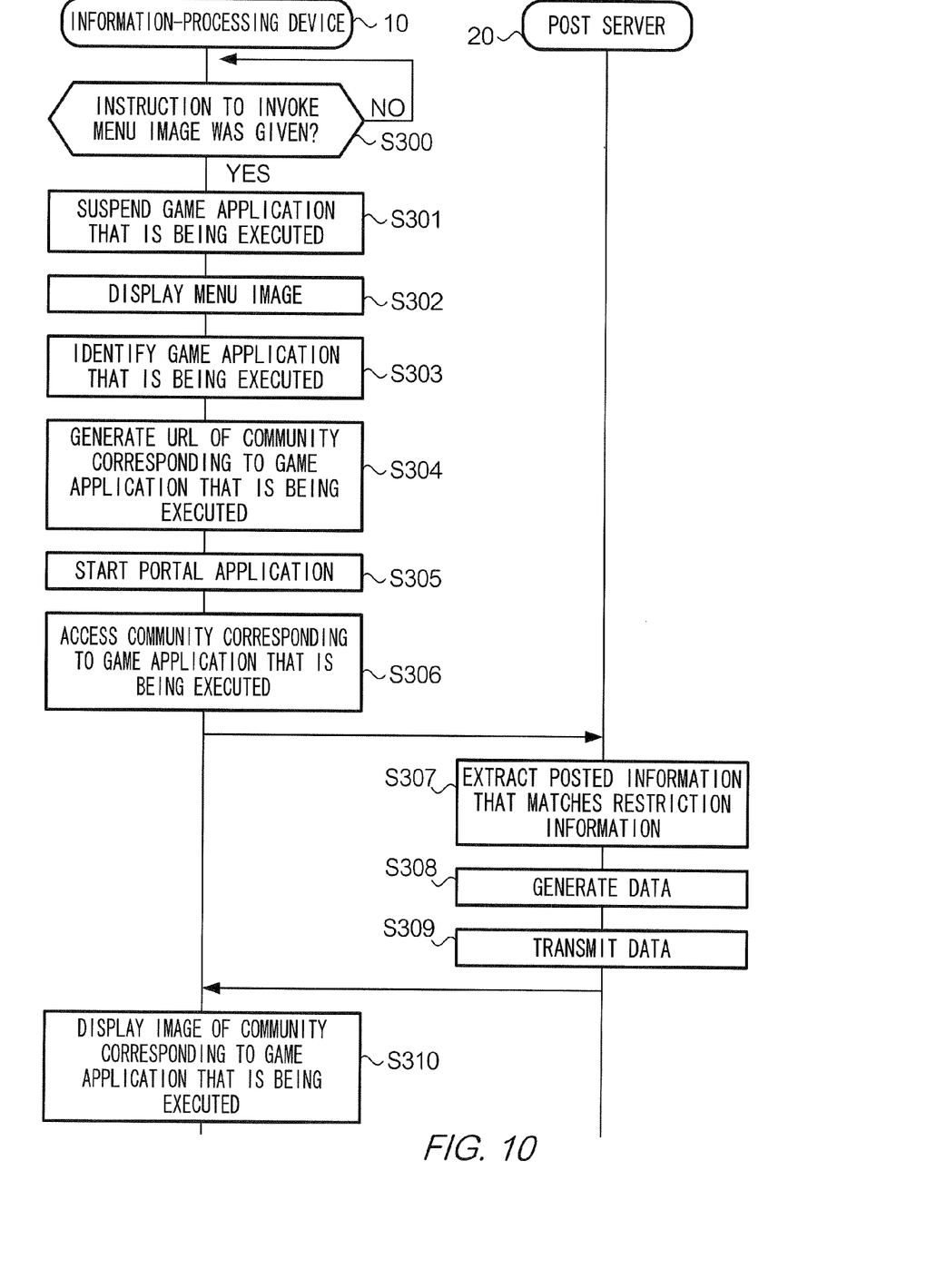
FIG. 10 shows an example of a sequence chart illustrating an operation of information-processing device 10.

FIG. 10 is a sequence chart illustrating an operation of information-processing device 10. In step S300, OS 511 determines whether or not an instruction to invoke the menu image was given during execution of game application 53. OS 511 monitors a specific operation performed by input module 104 while executing the game application. If the specific operation is performed by input module 104, OS 511 determines that an instruction to invoke the menu image has been given. If it is determined that an instruction to invoke the menu image has been given (step S300: YES), OS 511 advances the process to step S301. If it is determined that an instruction to invoke the menu image has not been given (step S300: NO), OS 511 continues execution of game application 53.

In step S301, OS 511 suspends game application 53 that is being executed. In other words, OS 511 starts another program while keeping the data used for execution of game application 53 deployed in memory 102.

In step S302, OS 511 displays the menu image. The menu image includes an item for giving an instruction to start portal software 52. If the user selects this item, OS 511 advances the process to step S303.

In step S303, application specifying module 512 specifies the application program (game application 53 in this example) that was being executed when the instruction to invoke the menu image was given. Specifically, the following process is performed. OS 511 reads out, from memory 102, the application ID of the application program being executed. Next, OS 511 invokes application specifying module 512. At this time of invoking, OS 511 notifies application specifying module 512 of the read application ID. Note that the application ID of the application program being executed is stored in memory 102 through a process independent from the flow of FIG. 10. Specifically, OS 511 obtains the application ID from the application program when starting this application program, and stores, in memory 102, the application ID of the application program being executed until the application program is finished.

In step S304, identification information generating module 513 generates a URL (an example of community identification information) of the corresponding community from the application ID specified by application specifying module 512. Identification information generating module 513 includes a table, a function, or rule information for converting an application ID into an URL, and refers to this table, function, or rule information to generate an URL based on the application ID.

In step S305, OS 511 starts portal software 52. At this time, OS 511 notifies portal software 52 of the URL generated by identification information generating module 513 as the URL of the community to be accessed at the time of start.

In step S306, portal software 52 accesses the community indicated by the notified URL. In other words, portal software 52 accesses a resource corresponding to game application 53 (in this example, a directory corresponding to the application program being executed among plural directories on post server 20) that is the application program that was being executed when the instruction to start portal software 52 was given.

When accessing post server 20, access module 514 transmits an access request including the application ID and the user ID of the user of information-processing device 10 to post server 20. The user ID is identification information of the user that logs into information-processing device 10 (the user using information-processing device 10 at this time). The user ID is specified through a so-called login process at a predetermined time, such as when information-processing device 10 is started.

Upon receiving the request from information-processing device 10, post server 20 refers to user setting information, and extracts the posted information that meets the restriction condition from among the posted information registered in post database 212 (step S307). Specifically, if, for example, the application ID included in the access request is "AAA001", the items of the posted information with the post IDs "351245", "351243", "351242", and "351241" in the example shown in FIG. 7 are extracted. Further, the posted information that meets the restriction condition is extracted therefrom. If, for example, the restriction condition indicates "the latest posted information of each user" and "up to three items of posted information in total", the items of posted information with the post IDs "351245", "351243", and "351241" are ultimately extracted.

Post server 20 arranges the extracted items of posted information in a predetermined order (e.g., in time series). Post server 20 generates data describing those items of posted information in a predetermined format (e.g., HTML (HyperText Markup Language)) (step S308). The generated data includes identification information on the community to which access is requested (hereinafter referred to as "community ID": a community ID is, for example, part of the URL of the community). Post server 20 transmits the generated data to information-processing device 10 that transmitted the access request (step S309).

In step S310, portal software 52 displays an image (displayed screen) in accordance with the data received from post server 20.

Figure 11:
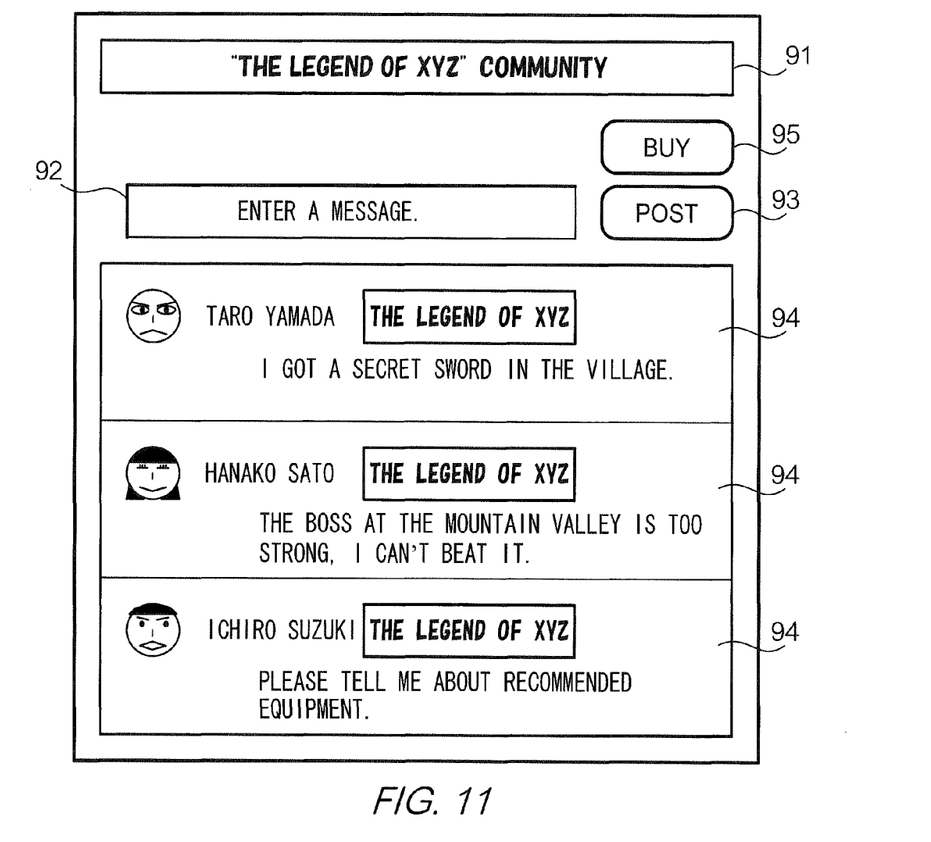
FIG. 11 shows an example of image of a posted information sharing service.

FIG. 11 is a diagram showing an exemplary image of the posted information sharing service, or more specifically, a communication tool in a certain community. The image includes title 91, text box 92, post button 93, plural items of posted information 94, and buy button 95. In other words, this image includes a user interface for the bulletin board function. Title 91 indicates a title of the community. In this example, the application program is a program (game application) for implementing a video game, and title 91 includes information (at least either a character string or an image) for specifying the application program to which the community belongs. In this example, title 91 indicates that this community corresponds to a game titled "The legend of XYZ". Text box 92 is used to enter a message to be posted. Post button 93 is used to input an instruction to transmit data, such as the message input in text box 92, to the posted information sharing system (server). Posted information 94 indicates posts from other users. The detail of posted information 94 will be described later. Buy button 95 is used to input an instruction to access a site where the corresponding application program can be purchased.

Figure 12:
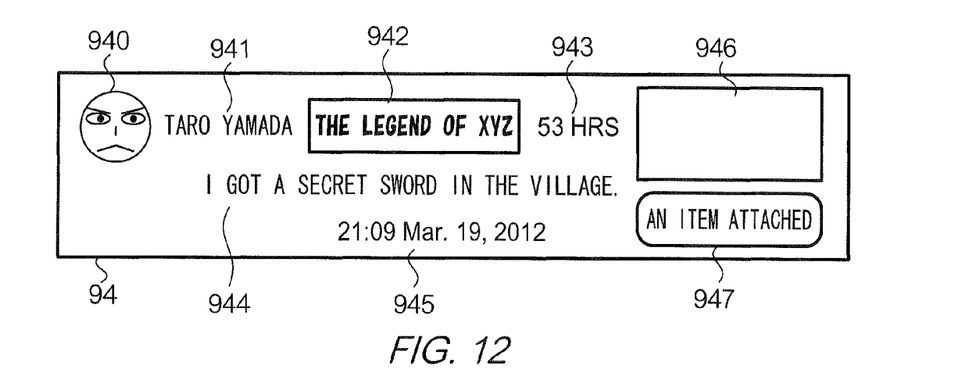
FIG. 12 shows an example of a detail of posted information 94.

FIG. 12 is a diagram showing exemplary details of posted information 94. Posted information 94 includes user image 940, user ID 941, application name 942, progress information 943, post 944, time stamp 945, screenshot image 946, and attached data image 947. User image 940 is an image set for each user, and indicates the user that posted the posted information 94. In this example, the user image is a so-called avatar image. User ID 941 indicates the name of the user that posted the posted information 94. Application name 942 is information for specifying the application program that was being executed on the information-processing device of the poster when an instruction to post the posted information 94 was given.

Progress information 943 is information indicating the progress of the application program that is being executed, for example, information indicating a stage name, a save point name, cumulative play time, or the like in the game. Post 944 indicates a post input by the user that transmitted posted information 94. Time stamp 945 indicates the time when posted information 94 was posted. Post 944 usually is a sentence such as an opinion, impression, question, message or the like concerning the application program that is in an interruption state at the time of posting. In other words, post 944 is a post concerning application name 942.

Screenshot image 946 is a screenshot image of the application program being executed. Attached data image 947 indicates whether or not any data corresponding to posted information 94 is attached. This attached data is data generated by the application program being executed, which is, for example, data indicating a virtual object such as an item in the game.

Note that the specific display of the posted information is not limited to the example shown in FIG. 12. For example, an example was described in FIG. 12 in which the progress information of "53 hrs" is displayed as it is. However, portal software 52 may change the display of at least one item (e.g., shape, color, or size) included in the posted information, in accordance with play information indicating whether or not the application program has been used before (in the case of game, whether or not the game has been played before). In one example, portal software 52 may display user ID 942 in different colors in the case where the play information indicates "played" (in the case where the post was made by a user that has played the game before) and in the case where the play information indicates "not played" (in the case where the post was made by a user that has never played the game before). Alternatively, portal software 52 may display an image (a mark or an icon) indicating whether or not there is the progress information.

With the process described in the flow of FIG. 10, the process relating to access to the posting server and the process for providing a UI are executed by the system software or the portal software. In other words, even if a function for accessing the posting server is not provided in the user application program, the user can readily access a community corresponding to this user application program. For example, the user can share happy, sad, or other various experiences, such as an experience of getting a rare item, clearing a stage, or facing difficulty, while playing the game. Further, a developer of an application program can reduce the development cost of implementing a function and a UI for accessing the posting server.

Note that in the above-described example, portal software 52 is started from the user application program via the menu image. However, portal software 52 may be started other than via the menu image. In this case, OS 511 starts portal software 52 when a specific operation is performed while game application 53 is being executed. Further, when the menu image is invoked, game application 53 that was being executed until then does not have to be suspended, and may alternatively be executed continuously in the background. Further, instead of the user ID, a device ID (identification information on information-processing device 10) may be used.

2-4. Posting to a Community

Figure 13:
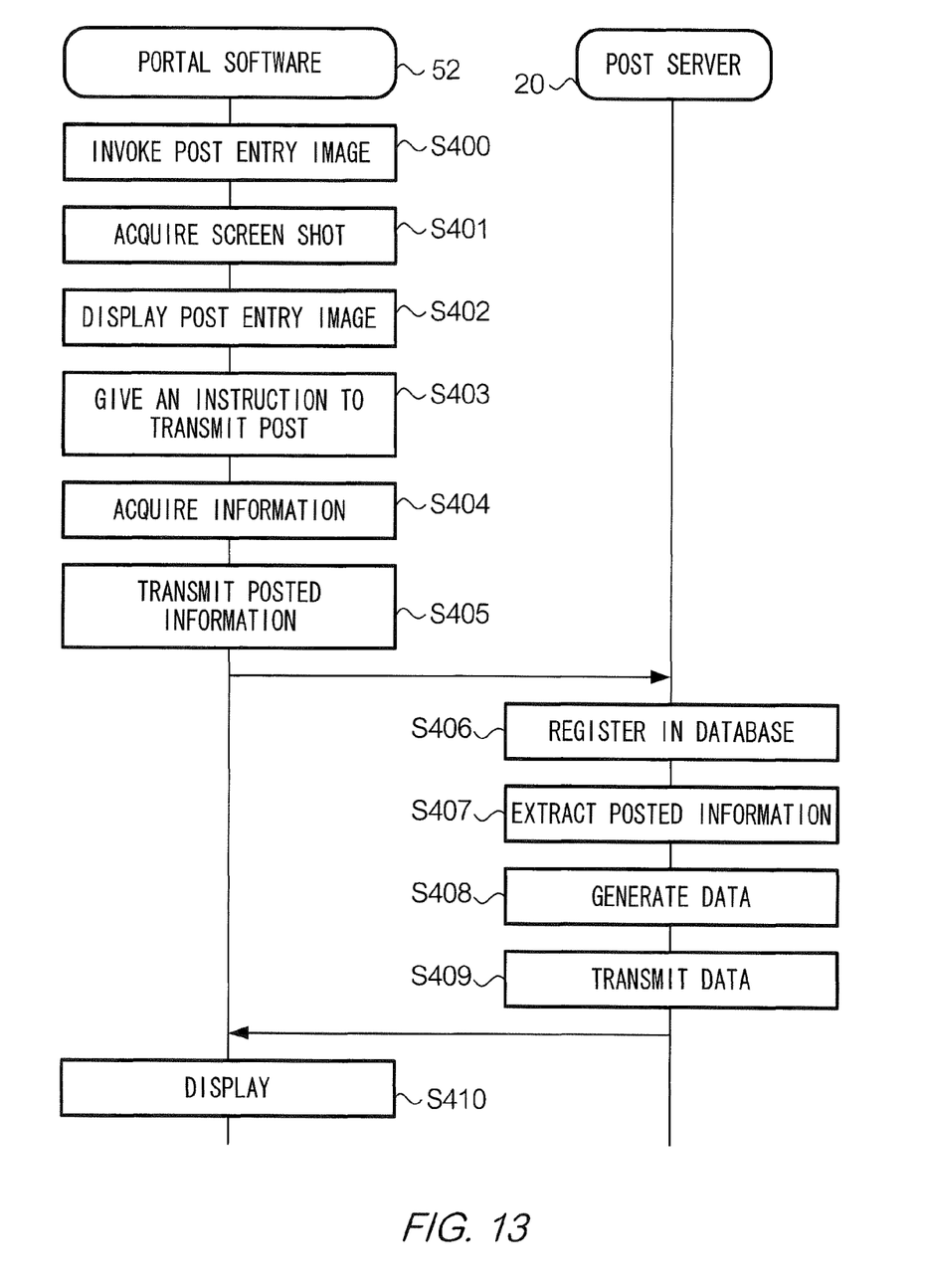
FIG. 13 shows an example of a sequence chart illustrating a process for browsing posted information in a community.

FIG. 13 is a sequence chart illustrating a process for posting a message or the like. Here, an example will be described in which portal software 52 is invoked while game application 53 is being executed to post a post via portal software 52. The flow of FIG. 13 shows a process after portal software 52 is invoked while game application 53 is being executed. In step S400, portal software 52 invokes a post entry image. The post entry image is invoked in response to a predetermined event, such as the event of an instruction to start portal software 52 being given.

In step S401, portal software 52 obtains a screenshot image of the application being executed. The application program being executed is an application program that was being executed when an instruction to start portal software 52 was given, and is game application 53 in this example. While portal software 52 is being executed, game application 53 is suspended. As already described, while game application 53 is suspended, the data used to execute game application 53 is deployed in memory 102. Portal software 52 generates a screenshot image based on the data of game application 53 deployed in memory 102.

In step S402, portal software 52 displays the post entry image. The post entry image is, for example, the image of FIG. 11. The user enters a post in the post entry image. After completing entry of the post, the user gives an instruction to transmit the post (e.g., by clicking post button 93) (step S403).

In step S404, portal software 52 obtains the attribute information used in the posted information. In this example, as the attribute information, a time stamp, a user ID, an application ID, a community ID and play information are used. The time stamp indicates the current time. The application ID is identification information of suspended game application 53. The play information is information indicating whether or not suspended game application 53 has been played, and naturally indicates "played" in this case. Note that if a user that has never played game application 53 posts a message or the like to the community corresponding to this game application via portal software 52, the play information indicates "not played". The time stamp, user ID, application ID, and play information are held by OS 511. Portal software 52 obtains, from OS 511, the time stamp, user ID, application ID, and play information. The community ID is identification information of the community to which portal software 52 is accessing. The community ID is held by portal software 52.

Regarding the play information, OS 511 holds, for example, the cumulative play time by the following a process that is independent from the process of FIG. 13. If the cumulative play time is larger than zero, "played" is used as the play information, while "not played" is used as the play information if the cumulative play time is zero. Memory 102 stores information of use of application programs that were executed in the past on this information-processing device 10 in association with the application IDs. For example, if ten game applications were executed in the past on this information-processing device 10, ten pairs of application IDs and cumulative play times are stored in memory 102. OS 511, after starting an application program, measures the time period during which the application program is executed, using a timer (not shown in the drawings). At a predetermined time (e.g., regularly, or at the time when the application program ends), OS 511 adds the time period during which the application program was executed to the cumulative play time corresponding to the application ID of the application program being executed, among the plurality of cumulative play times stored in memory 102. Note that the cumulative play time may be stored for each user ID.

Referring again to FIG. 13, in step S405, portal software 52 transmits the posted information to post server 20 via access module 514. This posted information includes the screenshot obtained in step S401 and the attribute information obtained in step S404.

In step S406, post server 20 registers the received posted information in post database 212. Post server 20 extracts the posted information that matches the restriction condition from post database 212 (step S407). Post server 20 generates data describing this posted information in a predetermined format (step S408). Post server 20 transmits the generated data to information-processing device 10 that transmitted the access request (step S409). Portal software 52 displays an image in accordance with the data received from post server 20 (step S410). The details of steps S407 to S410 are the same as steps S307 to S310.

3. Modification

The technology herein is not limited to the above-described embodiment, and various modifications are possible. Some modifications will be described below. Two or more of the following modifications may also be used in combination.

3-1. Modification 1

Regarding the posted information displayed during loading, the posted information that satisfies a predetermined condition, such as a condition that the user that made the post is a friend, may be preferentially displayed. A "friend" is a type of relationship set in an information sharing service, and is a relationship between two users that mutually agreed (accepted) to be friends. In this case, game application 53 may acquire posted information randomly from post server 20 and preferentially display the posted information of friends from among the obtained posted information. In another example, game application 53 may preferentially acquire, from post server 20, the posted information posted by friends and display posted information selected randomly from among the obtained posted information. To preferentially display (acquire) means, for example, to display (acquire) a predetermined number of items of the posted information of friends, and then display (acquire) the randomly selected posted information for the rest. According to this example, information that attracts more interest of the user can be displayed.

Note that posted information to be preferentially displayed or obtained is not limited to that of friends. For example, the following posted information may be preferentially displayed or obtained:

Posted information concerning the progress of the game. For example, posted information posted by a user that played a stage to be loaded (or that has been)

Posted information concerning how good a user is at playing the game (rating). For example, posted information posted by a user that is good at playing the game, or a strong user.

Time series posted information. For example, posted information selected in reverse chronological order.

3-2. Modification 2

The information displayed during loading is not limited to that described in the embodiment. In the embodiment, an example was described in which a post (such as a message) in the posted information is displayed. However, instead of, or in addition to, the post, the following information obtained from the server or the like via the network may be displayed:

Screenshot image

Advertisement (Notification)

Replay video of other users

Game score

3-3. Modification 3

In the embodiment, an example was described in which the same posted information continues to be displayed after loading is started until the loading ends. However, the displayed posted information may be switched to be new posted information at predetermined time intervals.

3-4. Other Modifications

Information-processing device 10 is not limited to a console-type game device. Information-processing device 10 may alternatively be a portable game device, or an information-processing device other than a game device, such as a personal computer, a mobile phone, a PDA (Personal Digital Assistant), or a tablet terminal. Further, the application program executed in information-processing device 10 is not limited to a game application. An application program for implementing a function other than a game, such as a document editing application, a learning application, or other practical software, may be executed in information-processing device 10.

The hardware configuration of information-processing device 10 is not limited to that described in FIG. 3. An apparatus having any hardware configuration capable of implementing the functions described in FIG. 1 may be used. For example, information-processing device 10 may include, as input module 104, an input device having a display unit (e.g., a controller having a touch panel). This display unit is different from display device 50. In this case, portal software 52 causes the image of information-processing system 1 to be displayed on both display device 50 and this input device. Alternatively, portal software 52 may cause the image of the posted information sharing system to be displayed only on the input device, and cause a different image (e.g., merely wallpaper) to be displayed on display device 50. The decision as to whether to display the image of the posted information sharing system on both display device 50 and the input device or only on the input device may be made by the user. In the case where the image of the posted information sharing system is displayed only on the input device, when the game is suspended and portal software 52 is started, portal software 52 may cause the image (screenshot) of the suspended game to be displayed on display device 50.

The sequence charts and the flowchart described in the embodiment are only examples, and the order of the processes is not limited to that shown as the examples in the sequence charts.

The posted information is not limited to that input by the user. A fixed phrase or the like stored in advance in the application program may be automatically posted when a predetermined condition is satisfied, rather than being input by the user.

The devices and software that constitute information-processing system 1 are not limited to those described in the embodiment. For example, at least part of the functions of information-processing device 10 described in the embodiment may be possessed by the server device. In other words, instead of one information-processing device 10, an information-processing system constituted by a server and a terminal may be used. In this case, the units in the information-processing system are implemented with a process by a processor of the terminal device, a process by a processor of the server, or cooperative processing by the processors of the terminal device and the server. Allocation of the processes may be designed as appropriate based on technical common sense of a person skilled in the art. Further, the server in this system may be the same apparatus as, or different from, the post server 20.

The application program executed by information-processing device 10 is not limited to that provided by the storage medium. The application program may alternatively be provided by download via a network such as the Internet. Further, system software of information-processing device 10 may be provided by the storage medium or by means of downloading.

What is claimed is:

1. An information-processing system comprising
a server including:
a storage configured to store data; and
a first processor configured to perform at least:
storing a plurality of items of data in the storage; and
providing at least a part of the data stored in the storage to a user, and
an information-processing device including a second processor configured to perform at least:
executing a process relating to an application program selected from among a plurality of application programs;
determining whether the application program or data used in the application program is being loaded;
responsive to determining the application program or the data is being loaded, controlling a display to display information, which information is indicated by at least one item of data obtained from the storage via a network during loading of the application program or the data, said at least one item of data being uniquely associated with the application program or the data being loaded, wherein
the storage is further configured to store the plurality of items of data in association with first identification information that indicates respective related application programs, and
the second processor of the information-processing device is further configured to obtain an item of data associated with the application program that is being executed from among the plurality of items of data stored in the storage, and wherein
while an application program or data used in the application program is being loaded, the second processor of the information processing device is further configured to perform controlling the display to display the obtained information associated with the application program, wherein the storage is further configured to store the plurality of items of data in association with identification information of the application programs and identification information of a process in the application programs,
the second processor further controls the display to display information indicated by an item of data associated with a process corresponding to a time when the loading occurs in the process relating to the selected application program, among the items of data stored in the storage, and wherein
the second processor further controls the display to display information indicated by an item of data associated with the process performed after the loading in the process relating to the selected application program.

2. The information-processing system according to claim 1, wherein
the first processor is further configured to perform generating posted information relating to at least one application program among the plurality of application programs, and the storage is further configured to store the posted information, as the data.

3. The information-processing system according to claim 1, wherein
the executing includes obtaining the item of data associated with the application program.

4. The information-processing system according to claim 1, wherein
the second processor further controls the display to display information indicated by an item of data associated with the process that was being performed before the loading in the process relating to the selected application program.

5. The information-processing system according to claim 1, wherein
the storage is further configured to store the plurality of items of data in association with second identification information indicating a user that posted each item of data, and the first identification information, the second processor of the information-processing device is further configured to obtain a plurality of items of data from the storage, and
the second processor is further configured to control the display to display an item of data whose second identification information satisfies a predetermined condition, among the plurality of obtained items of data.

6. The information-processing system according to claim 1, wherein
the storage is further configured to store the plurality of items of data in association with second identification information indicating a user that posted each item of data, and the first identification information, and
the second processor of the information-processing device is further configured to preferentially obtain an item of data whose second identification information satisfies a predetermined condition from among the plurality of items of data stored in the storage.

7. The information-processing system according to claim 1, wherein
the second processor of the information-processing device is further configured to obtain data from the storage before the loading is started.

8. An information-processing device, comprising
a memory; and
a computer processor configured to perform at least:
executing a process relating to an application program selected from among a plurality of application programs;

determining whether the application program or data used in the application program is being loaded; and responsive to determining the application program or the data is being loaded, controlling a display to display information, which information is indicated by at least one item of data obtained via a network from a storage that stores a plurality of items of data during loading of the application program or the data, said at least one item of data being uniquely associated with the application program or the data being loaded, wherein the storage is configured to store the plurality of items of data in association with first identification information that indicates respective related application programs, and the computer processor of the information-processing device is further configured to obtain an item of data associated with the application program that is being executed from among the plurality of items of data stored in the storage, and wherein while an application program or data used in the application program is being loaded the computer processor of the information processing device is further configured to perform controlling the display to display the obtained information associated with the application program, the storage is further configured to store the plurality of items of data in association with identification information of the application programs and identification information of a process in the application programs, the computer processor further controls the display to display information indicated by an item of data associated with a process corresponding to a time when the loading occurs in the process relating to the selected application program, among the items of data stored in the storage, and wherein the computer processor further controls the display to display information indicated by an item of data associated with the process performed after the loading in the process relating to the selected application program.

9. A non-transitory computer-readable storage medium storing a program for causing a computer processor of an information-processing device to execute a process, the process comprising:

executing a process relating to an application program selected from among a plurality of application programs;

determining whether the application program or data used in the application program is being loaded; and responsive to determining the application program or the data is being loaded, controlling a display to display information, which information is indicated by at least one item of data obtained via a network from a storage that stores a plurality of items of data during loading of the application program or the data, said at least one item of data being uniquely associated with the application program or the data being loaded, wherein the storage is configured to store the plurality of items of data in association with first identification information that indicates respective related application programs, and the computer processor of the information-processing device is further configured to obtain an item of data associated with the application program that is being executed from among the plurality of items of data stored in the storage, and wherein while an application program or data used in the application program is being loaded, the computer processor of the information processing device is further configured to perform controlling the display to display the obtained information associated with the application program, wherein the storage is further configured to store the plurality of items of data in association with identification information of the application programs and identification information of a process in the application programs, the computer processor of the information-processing device further controls the display to display information indicated by an item of data associated with a process corresponding to a time when the loading occurs in the process relating to the selected application program, among the items of data stored in the storage, and wherein the computer processor of the information-processing device further controls the display to display information indicated by an item of data associated with the process performed after the loading in the process relating to the selected application program.

10. An information-processing method of an information-processing system comprising an information-processing device including a computer processor configured to execute a process relating to an application program selected from among a plurality of application programs, and a server including a computer processor configured to perform sharing data, the method comprising:

storing data in a storage;

providing at least part of the data stored in the storage to a user;

determining whether the application program or data used in the application program is being loaded to the computer processor of the information-processing device; and responsive to determining the application program or the data is being loaded, controlling a display to display information, which information is indicated by at least one item of data obtained from the storage via a network during loading of the application program or the data, said at least one item of data being uniquely associated with the application program or the data being loaded, wherein the storing stores the plurality of items of data in association with first identification information that indicates respective related application programs, and the computer processor of the information-processing device is further configured to obtain an item of data associated with the application program that is being executed from among the plurality of items of data stored in the storage, and wherein while an application program or data used in the application program is being loaded, the computer processor of the information processing device is further configured to perform controlling the display to display the obtained information associated with the application program, wherein the storage is further configured to store the plurality of items of data in association with identification information of the application programs and identification information of a process in the application programs, the computer processor of the information-processing device further controls the display to display information indicated by an item of data associated with a process corresponding to a time when the loading occurs in the process relating to the selected application program, among the items of data stored in the storage, and wherein the computer processor of the information-processing device further controls the display to display information indicated by an item of data associated with the process performed after the loading in the process relating to the selected application program.

* * * * *